United States Patent [19]
Sprague et al.

[11] Patent Number: 5,550,656
[45] Date of Patent: Aug. 27, 1996

[54] FULL COLOR DISPLAY WITH PLURAL TWO-DIMENSIONAL PLANAR ARRAYS OF LENSLETS

[75] Inventors: Robert A. Sprague, Saratoga; RIchard H. Bruce, Los Altos, both of Calif.; Louis D. Silverstein, Scottsdale, Ariz.

[73] Assignee: Xerox Corporation, Stamford, Conn.

[21] Appl. No.: 450,964

[22] Filed: May 25, 1995

Related U.S. Application Data

[62] Division of Ser. No. 900,813, Jun. 17, 1992, abandoned.

[51] Int. Cl.$^6$ ................................................. G02F 1/1335
[52] U.S. Cl. ............................... 359/40; 359/50; 359/622
[58] Field of Search ................................. 359/40, 41, 50,
359/619, 621, 622, 626; 353/30, 31, 122;
345/88; 348/760, 761, 766, 791

[56] References Cited

U.S. PATENT DOCUMENTS

| | | | |
|---|---|---|---|
| 4,330,813 | 5/1982 | Deutsch | 359/48 |
| 4,734,779 | 3/1988 | Levis et al. | 353/30 |
| 4,799,050 | 1/1989 | Prince et al. | 359/50 |
| 5,056,912 | 10/1991 | Hamada et al. | 359/64 |
| 5,083,854 | 1/1992 | Zampolin et al. | 359/72 |
| 5,267,062 | 11/1993 | Bottorf | 359/50 |

FOREIGN PATENT DOCUMENTS

| | | | |
|---|---|---|---|
| 2-101430 | 4/1990 | Japan | 359/66 |
| 4-107420 | 4/1992 | Japan | 359/40 |

OTHER PUBLICATIONS

Hamada et al "Brightness Enhancement of an LCD Projector by a Planar Microlens Array" SID92 Digest–May 1992–pp. 269–272.

R. J. Wohl "Short Length Optical System" IBM Technical Disclosure Bulletin–vol. 13–No. 10–Mar. 1971–p. 2947.
Pennington et al "CCD Imaging Array Combining Fly's–Eye Lens with TDI For Increased Light Gathering Ability" IBM Technical Disclosure Bulletin–vol. 21–No. 2–Jul. 1978–pp. 857–858.

Primary Examiner—William L. Sikes
Assistant Examiner—Tai V. Duong
Attorney, Agent, or Firm—Judith C. Bares; Tracy L. Hurt

[57] ABSTRACT

A full color display is disclosed having a high efficiency light source optically coupled by a light coupling lens array to the active matrix of pixel elements of an image forming means such as a transmissive liquid crystal light valve. The light source is comprised of a patterned matrix of individual, primary colored visible radiation emitters, such as individual phosphor elements, arranged in a manner suitable for the human eye to integrate the individual primary colored lights into a single mixture color. The light coupling lens array collects substantially all of the light rays emitted from each primary colored light emitter and focuses them on a respective one of the transparent electrodes in the active matrix, as a real image smaller than the size of the electrode. A suitable light coupling lens array is a gradient index lens array, a multiple layer, two dimensional array of microlenses functionally analogous to an array of strip lenses, or a microlens array. A twisted nematic liquid crystal cell may be used in the image forming means to achieve a high contrast display. Use of the light coupling lens array to collect and focus the light rays from the light source permits the focused light to pass through an entrance polarizer with minimal scattering or divergence, and then through the respective transparent electrode in the active matrix unobscured by the opaque pixel interconnect elements. More efficient use of a larger percentage of the light from the light source in this manner results in the formation of a bright, high contrast, full color image.

2 Claims, 8 Drawing Sheets

FULL COLOR DISPLAY WITH PLURAL TWO-DIMENSIONAL PLANAR ARRAYS OF LENSLETS

This is a division, of application Ser. No. 07/900,813, filed Jun. 17, 1992, now abandoned.

FIELD OF THE INVENTION

This invention relates to full color, high resolution displays having a highly efficient backlight source and, more particularly, to an improved optical coupling arrangement for transmitting light from the light source to the image forming light valve.

CROSS REFERENCE TO RELATED APPLICATIONS

Two concurrently filed and commonly assigned U.S. patent applications of Silverstein, et. al., entitled respectively "Two Path Liquid Crystal Light Valve Color Display" and "Two Path Liquid Crystal Light Valve Color Display With Light Coupling Lens Array", relate to full color liquid crystal displays having two optical paths, the latter patent application relating to a full color display having two optical paths in which red and green light from an efficient, colored backlight in one path is optically coupled to an aligned matrix of addressable pixel electrodes in a liquid crystal image forming means. The invention described herein, in turn, provides a full color display which optically couples colored light from individual primary colored emitters of an efficient backlight to an aligned matrix of addressable pixel elements in an image forming means to form a full color image by additive spatial juxtaposition.

BACKGROUND OF THE INVENTION

Full color information systems for the display of high definition video information and complex pictorial and graphics images must (1) provide high image resolution for precise edge definition and image sharpness; (2) maintain high display and image luminance and contrast control for maximum image brightness in a variety of display environments; and (3) achieve high color fidelity by maintaining precise, predictable control over color synthesis and reproduction using the largest color gamut available. For purposes of the discussion herein, the term "full color" display or display image means a display or display image which is capable of producing color from the full spectrum of visible light, and which uses at least three additive or subtractive primary colors to produce the full spectrum. In addition, full color, high information content display systems must also be (4) small and compact; (5) should minimize power consumption; (6) should maximize response time (the speed with which the display can be updated); and (7) must be able to be manufactured at a low unit cost in order to be useful in a wide variety of applications.

Existing color displays using a variety of technologies to produce full color, high resolution displays are deficient in one or more of the goals enumerated above. For example, the dominant color production system for the production of direct view, full color visual displays utilizes shadow-mask cathode ray tube (CRT) technology. While CRT displays have sufficient image resolution and generally good color rendition, they are typically large and heavy, consume considerable power, and have marginal luminance and contrast for the variety of environmental conditions in which displays must operate.

1. Twisted Nematic AMCLCD Technology.

A leading alternative to CRT display technology for high information content, full color visual displays is backlit liquid crystal display (LCD) technology. Displays using liquid crystal technology are thin and light, and offer potentially compact construction. Further, voltages and power levels required to actuate liquid crystal materials to a preferred orientation for modulating incident light are relatively low. LCD technology for high information content displays can be divided into two categories: nonactive multiplexed matrix technology and active matrix addressed color liquid crystal display (AMCLCD) technology. In nonactive multiplexed matrix technology, pixel positions are energized by voltages applied via intersecting row and column drivers. This is usually done by multiplexing the rows and turning on the needed column drivers in synch with each row as it is multiplexed. Displays with multiplexed LCD panels are limited in the image resolution which they may achieve, and have generally low contrast. Further, image quality, chromatic integrity, luminance and contrast are significantly affected by the angle at which the observer views the display. More importantly, displays with multiplexed LCD panels have inherently slow response times which are currently inadequate for supporting the display of output generated from graphics (animation) and pointing device (mouse) software.

In AMCLCD technology, the matrix of liquid crystal pixels consists of an active area (a region where the liquid crystal can modulate the input light) and an inactive area (a region composed of electrode data and scan lines and busbars, which are collectively called "interconnect"). The active area of each picture element (pixel) is controlled by an active element, usually a thin-film transistor (TFT), located at each pixel position. Such a matrix structure of active thin-film transistors can be fabricated with the deposition of a suitable material for forming thin-film transistors which typically includes, but is not limited to, polysilicon, amorphous silicon, semiconducting, and insulating films. These films are patterned using standard lithographic techniques to form the desired structure. The transistors are arranged in a matrix and deposited on a transparent substrate to form a planar matrix of sample-and-hold elements with associated transparent electrodes, each element being individually addressed by row and column in much the same way as a bit in memory. A planar body of liquid crystal material is sandwiched between a planar transparent common conductive electrode and the planar matrix of sample-and-hold elements with associated transparent electrodes, so that a field may be established across pixel elements of the liquid crystal. The state of an individual pixel of the liquid crystal display panel is controlled spatially by the application of a suitable voltage to gate lines and source lines to energize a locally addressable transparent electrode corresponding to the pixel within the matrix. The voltage can be placed and stored at each transparent electrode by the active thin film transistor.

The liquid crystal material which provides response to stimulation at video rates, and which provides the best ratio of the ON to OFF state (which is the major factor in determining display contrast) is nematic liquid crystal material. In the nematic structure, the direction of the long axes of the molecules in a given layer are slightly angularly displaced from the direction of the molecular axes in an adjacent layer. By applying a twist to this molecular packing, a helical structure is formed, and this mode is known as twisted nematic liquid crystal. Since the individual liquid crystal molecules have an elongated shape and dipoles (both permanent and induced) which are direction dependent, films of these materials exhibit anisotropy in their dielectric constant and refractive index. Materials that exhibit a positive dielectric anisotropy have molecules that tend to align themselves parallel to an applied electric field, while the molecules of materials that exhibit a negative dielectric anisotropy tend to align themselves perpendicular to the field. Because of their optical anisotropy, a change in the orientation of the liquid crystal molecules by an electric field can cause a change in polarization of transmitted light and thus a change in optical transmission when used in conjunction with light polarizers.

Figure 1A:
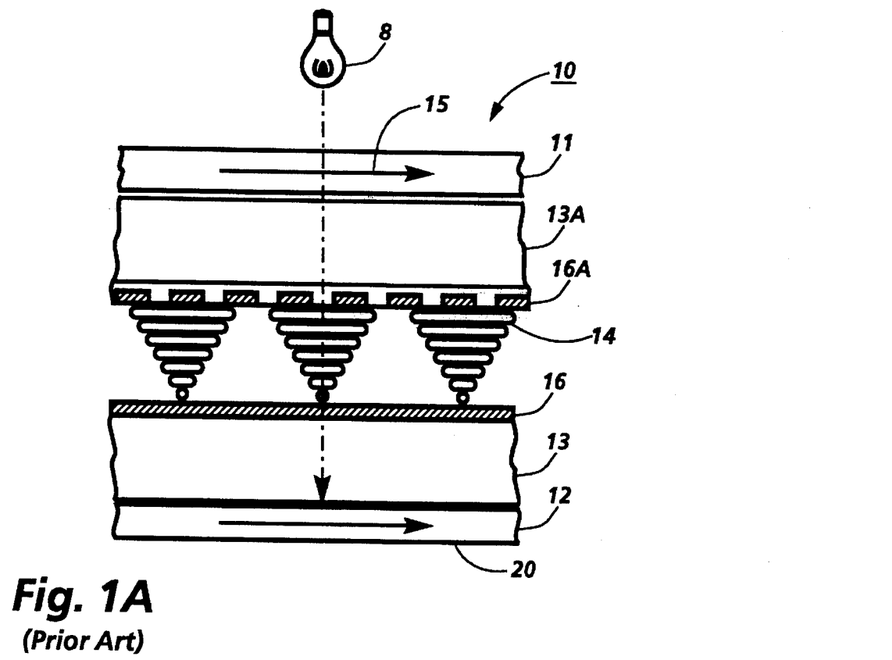
FIGS. 1A and 1B are cross-sectional views illustrating the light controlling properties of a twisted nematic liquid crystal light valve suitable for use in the present invention.
Figure 1B:
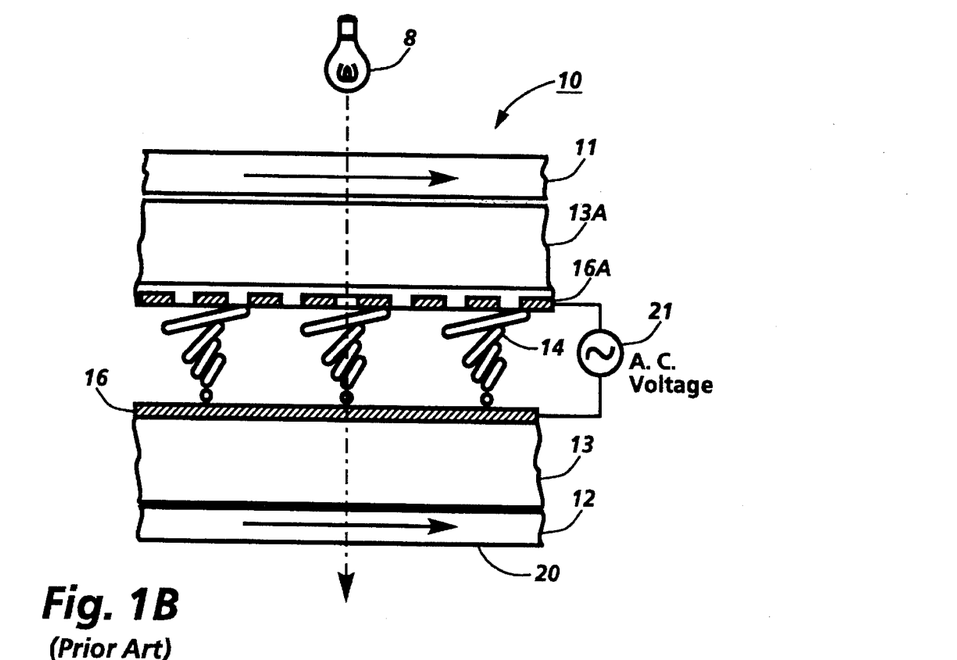

A transmissive, twisted nematic liquid crystal device 10, hereafter referred to as a "TNLC cell", is shown in FIG. 1A in the off state and in FIG. 1B in the energized state. Reference will be made to the location of components in TNLC cell 10 according to their relationship to light source 8, components closest to light source 8 being at the "rear" of TNLC cell 10, and components located farthest from light source 8 being at the "front" of TNLC cell 10. TNLC cell 10 comprises parallel, rear and front transparent substrates, respectively 13A and 13, each having transparent electrode layers 16A and 16, respectively, on the inner confronting surfaces of the substrates. Individual transparent elements on one of the electrode layers 16 or 16A, shown in FIGS. 1A and 1B on electrode layer 16A, are addressed by the matrix of active elements of the type described earlier, which controls the amount of voltage applied to each element. A thin layer of liquid crystal material of the nematic type is sandwiched between the substrates, and transparent alignment layers (not shown), which cover the transparent electrodes 16, maintain the liquid crystal molecules 14 in a fixed orientation relative to the substrate surfaces 13A and 13 while the molecules are in their stable relaxed state, i.e., with no voltage, or when a voltage below a threshold voltage is applied.

Optical control of light transmission from light source 8 is achieved by placing a rear polarizer 11 where the light enters the optical path of the liquid crystal display and another, front, polarizer (or analyzer) 12 where the light exits the optical path of the display. Both polarizers may be attached to the respective transparent substrates. For purposes of illustration, FIG. 1A shows that the polarizing axes of polarizers 11 and 12, denoted by arrows 15 and 20 respectively, are parallel. Rear polarizer 11 linearly polarizes the light incident to the TNLC cell in a first polarization plane, or orientation, indicated by arrow 15. Because of the relatively gradual twist of the liquid crystal molecules, polarized light entering the liquid crystal material gradually twists its direction of polarization as it passes therethrough, emerging with its polarization rotated by 90 degrees, to a second polarization orientation. The incident light in the second, orthogonal polarization orientation, is blocked by exit polarizer 12, resulting in a dark or opaque TNLC cell when viewed from the output side 20, with a substantial amount of polarized light being blocked by the polarizing direction of analyzer 12.

With the application of an alternating current (AC) voltage from source 21 that is above a certain threshold applied across electrodes 16 and 16A, as shown in FIG. 1B, the molecules 14 of the TN material rotate to align themselves substantially parallel to the applied electric field. In this energized, electrically driven, stable state (or ON state), the liquid crystal layer no longer twists the direction of the polarization of the light, and the light is transmitted by analyzer 12. At intermediate voltages, partial light transmission occurs. It is well understood by those skilled in the art that when polarizers are used on either side of the TNLC cell to control optical transmission, their transmission axes can be either parallel or perpendicular, depending on whether it is desirable that the driven (ON) state of the TNLC cell transmit light or block light, respectively. Hence, if the transmission axis of the exit polarizer 12 is parallel to that of the entrance polarizer 11, the TNLC cell will be dark in the absence of an applied voltage but will become transparent with the application of the voltage. Likewise if the transmission axis of the exit polarizer 12 is perpendicular to that of the incident polarizer 11, the TNLC cell will be transparent without a voltage and become dark with the application of a voltage.

Large format, high resolution active matrix displays using TN material have good display contrast and can achieve response times fast enough to accommodate software animation and pointing device applications, thus making them favored replacements for displays using CRT technology because of their packaging and luminance advantages.

2. Display Luminance

Display and image luminance, luminous efficiency, and color fidelity are interrelated factors in achieving a high quality, full color display using AMCLCD technology. Many LCD displays are perceived as dim in many ambient lighting situations. In a transmissive mode of operation, the display luminance is determined by both the luminance of a backlight, placed behind the display, and the transparency of the display. One factor which affects the transparency of the display is the structure of the active matrix addressing elements comprising the transparent conductive electrode. The transparency of the display is normally reduced by the amount of inactive area in the matrix, i.e., the presence of the opaque active elements and interconnect within the pixel. Since the transparent conductive electrode may comprise an area from about thirty per cent (30%) to about eighty per cent (80%) of the area of each pixel, depending on the display application, considerable display luminance may be lost by light which is blocked by the opaque addressing elements and which never enters the transparent portion of the pixel.

Another factor which affects display luminance is the use of color filters for color rendition. A predominant color synthesis method used in direct view, full color visual displays is additive color synthesis based on the spatial juxtaposition, or spatial proximity, of primary colors; the human eye perceives a color by spatially integrating the very small, juxtaposed primary (e.g., red, green, and blue) color pixels of the display. Additive spatial proximity color synthesis requires high pixel density (resolution) because the projected angular subtense of the primary color elements must be encompassed within the spatial integration zones of the human visual system in order for the eye to integrate a set of individual primary color pixels into a single mixture color.

For full color image formation, a matrix of active, individually addressable liquid crystal pixel elements or light valves (LCLVs) is typically constructed with a mosaic of individual (narrow band) primary color filters arranged on a single layer. The color filter mosaic is positioned immediately adjacent to the liquid crystal panel such that each individual color filter is in registration with a respective individual pixel element or LCLV and transmits only the desired portion of broadband (white) light while absorbing all other wavelengths. The backlight in such a display is typically a broadband light source with associated optical elements for controlling the spatial and angular distribution of the light before it enters the LCD panel. The absorptive color filter mosaic is a highly inefficient use of the energy contained in the light source, since it absorbs a substantial amount of the incident white light, often as much or more than one-half, during color selection and consequently reduces the luminance of the display still further.

Efficient generation and control of the radiation emanating from the backlight of the display therefore affords a practical and viable opportunity for maximizing the overall perceived brightness and luminous efficiency of the display. One solution, in simplest terms, is to increase the luminance of the backlight, and consequently the display, by increasing its power consumption. However, this introduces additional undesirable effects. In addition to conflicting with the goal of a display with low power consumption, this may produce harmful temperature rises within the system.

3. High Efficiency Color Emitting Backlight Source

Generating color without the use of light-absorbing filters provides an efficient solution to the display luminance problem. A backlight source composed of a patterned matrix of individual primary colored phosphor emitters in the same spatial configuration as the matrix of liquid crystal pixel elements in the LCD panel eliminates the need for the light-absorbing color filters, thereby providing more light directly into and through the liquid crystal light valves. Any suitable energy source may be used which provides either ultraviolet radiation or electrons for exciting the primary colored phosphor emitters to emit visible primary colored light.

Figure 2:
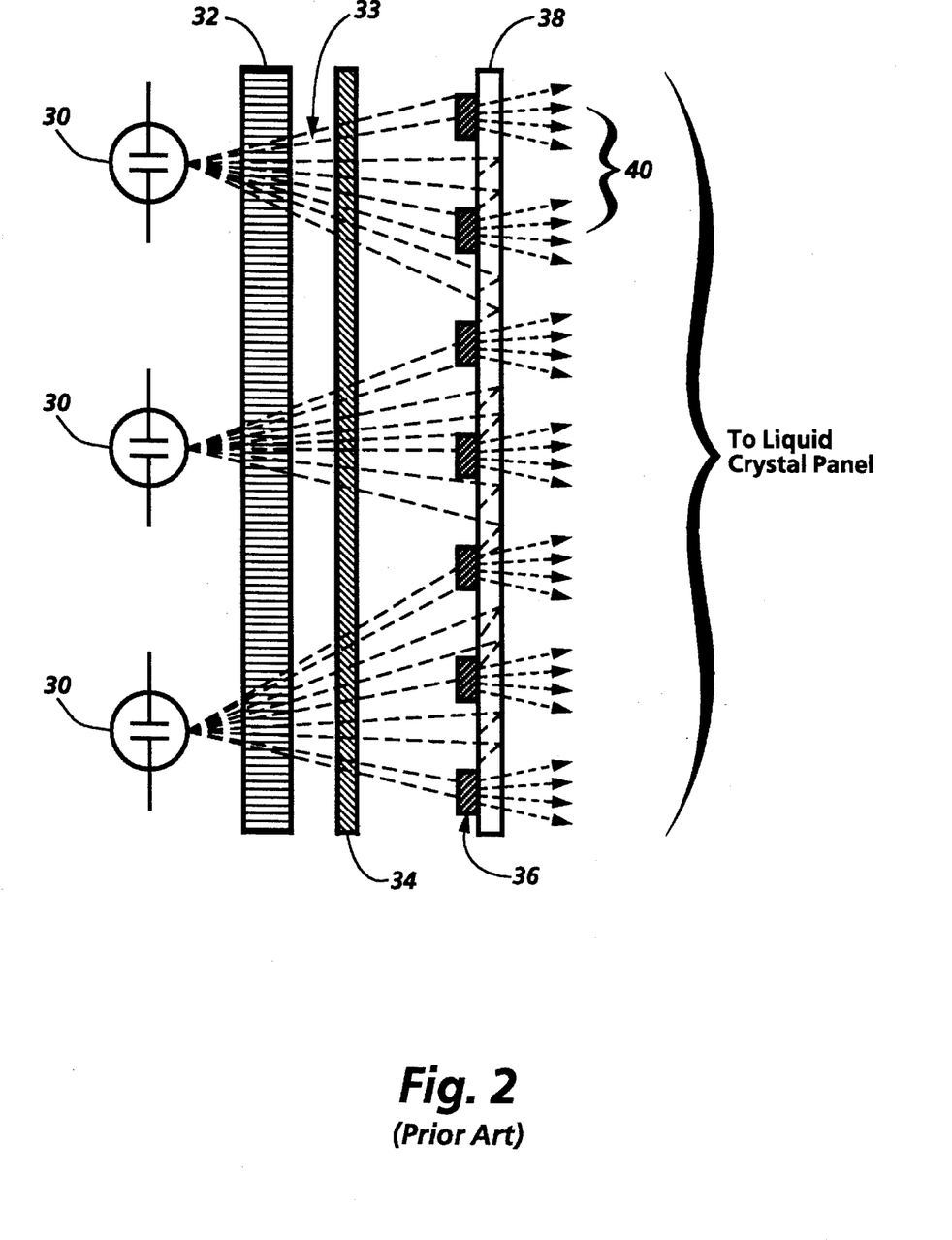
FIG. 2 is a schematic side view of a light source and its associated optical components suitable for use in the present invention.

A backlight source which emits primary colored light in a spatial matrix and which has the same spatial configuration as the matrix of pixel elements is described in U.S. Pat. No. 4,799,050 issued to Prince, et. al., entitled "Full Color Liquid Crystal Display". The light source described therein is suitable for use in the present invention. FIG. 2 illustrates the light source, comprised of a single or multiple lamps 30 and associated optical components, collectively designated as light source 22. Fluorescent lamp 30 is positioned at the backplane of the liquid crystal light valve disclosed in U.S. Pat. No. 4,799,050. The output of lamp 30 comprises ultraviolet radiation 33, rather than visible light, and fluorescent lamp 30 is chosen for its ability to excite phosphor material to emit visible light Fluorescent lamp 30 is also chosen for its intrinsically high energy conversion efficiency of fluorescent illumination, exceeding 50 lumens per watt. The electrodes of lamp 30 are enclosed within a clear envelope of quartz or other ultraviolet-transmissive material, and plate 32, which forms the rear surface of the light valve, is also preferably quartz and transmits ultraviolet radiation.

A first dichroic selective filter layer 34, which may be deposited on the inner surface of plate 32, is fabricated of material that is transmissive to ultraviolet radiation and reflects visible light. Ultraviolet radiation 33 from lamp 30 is thus transmitted through intervening layers 32 and 34 to reach layers 36 and 38.

Next in alignment, and closely spaced to first dichroic filter 34 is a second dichroic filter 38 which has deposited on it, on the surface closest to first dichroic filter layer 34, a phosphor layer 36 comprising a matrix arrangement of a plurality of discrete phosphor elements. The phosphor layer includes any material that converts energy from an external excitation and, by means of the phenomena of phosphorescence or fluorescence, converts such energy into visible light. In the embodiment of the LCD disclosed in U.S. Pat. No. 4,799,050, the dominant emission spectrum of fluorescent lamp 30 is between 254 nm. and 365 nm., a spectrum selected to match the excitation spectrum of the phosphors. Other energy sources, including electron beams are known to excite phosphors to emit visible light and may be substituted for fluorescent lamp 30.

In the embodiment of the LCD disclosed in U.S. Pat. No. 4,799,050, each phosphor element in phosphor layer 36 is aligned with a corresponding transparent pixel element in an active electrode matrix such as matrix 16A, shown in FIG. 1 and described above in the discussion of AMCLCD technology. Active electrode matrix 16A controls the transmission of light through the display. The alignment of the phosphor elements with respective pixel elements is accomplished by a light aligning technique described more fully below. The phosphor and electrode matrices may be formed onto a common material, but need not be in the present invention. In the case of a full color display, the phosphor element matrix consists of a plurality of phosphor types, each of which emits a wavelength emission spectrum in one of the primary colors upon excitation by ultraviolet radiation. The plurality of phosphors is preferably arranged into a pattern for integration by the eye into a single color from a mixture of primary colors by additive spatial juxtaposition. This pattern may include, for example, the conventional triad, quad (in which the green component is doubled) or fixed format geometries. The phosphors may be deposited by any of a number of well known processes including settling, screen printing, and photolithography.

As radiation 33 reaches the matrix of phosphor elements in phosphor layer 36, the ultraviolet radiation is efficiently converted to colored visible light. Ultraviolet radiation not initially absorbed by the phosphors in phosphor layer 36 is reflected from second dichroic layer 38 and may thereafter by absorbed by the phosphors, further increasing the efficiency of the system.

The visible light 40 emitted by the phosphors is radiated toward both the front and back of the liquid crystal light valve (toward plate 32 and dichroic filter 34). Due to the visible light reflectivity of the dichroic filter 34, the phosphor emissions that travel toward the backside of the light valve (not shown in FIG. 2) are reflected therefrom and toward the front of the display (as defined from the perspective of the observer). The close spacing between the phosphor matrix 36 and the adjacent dichroic filter 34 allows only minimal "spreading" of the reflected phosphor outputs. Thus, a high percentage of this reflected light is available for illumination of the display.

According to U.S. Pat. No. 4,799,050, use of fluorescent lamp 30 in conjunction with the color phosphor matrix, and in the absence of the matrix of color filters typically used in full color liquid crystal displays, achieves the maximum available energy efficiency offered by the utilization of fluorescent energy. This, in turn, directly results in a brighter display because substantially all of the generated light is employed.

For this highly efficient lighting approach to be effective, however, the colored light 40 from each phosphor emitter in phosphor layer 36 must be directly coupled to and channeled into a respective liquid crystal pixel element, and the channeled light must pass though only one pixel of the light valve. If the colored light from one emitter is allowed to spread and pass through an adjacent pixel, the chromatic integrity of the display will be negatively affected.

One approach to accommodate the requirement of carefully channeling the light from the phosphor emitters is described in U.S. Pat. No. 4,799,050. In this approach, the colored light sources are placed on one side of a fiber optic plate and the aligned active matrix with associated transparent electrodes is placed on the other side. The fiber optic plate channels the light and thus maintains the spatial distribution of the emitted light, preventing the light emitted from one pixel from spreading out and passing through other pixels. U.S. Pat. No. 4,799,050 discloses that the light emitters and the active matrix can be built on separate fiber optic plates which are optically bonded during assembly.

There are two main disadvantages in using a fiber optic face plate for the purpose of channeling the colored light from the phosphor emitters through the corresponding pixels in the light valve. The first is a fabrication problem. Using a fiber optic face plate adds significantly to the final unit cost of the display. In addition, the lithographic steps utilized in building a liquid crystal display on the fiber optic face plate require a very flat substrate material, and some of the processing steps require the substrate to retain this flatness after being subjected to high temperatures. The manufacturing complexity added to the fabrication of the display from using the fiber optic face plate decreases the reliability and significantly increases the unit cost of the display, which conflicts with the goals enumerated above for achieving a high quality, full color display.

More limiting than the manufacturing complexity, however, is the fact that the use of the fiber optic face place in the manner described in U.S. Pat. No. 4,799,050 makes more complicated and difficult the incorporation and operation of the entrance polarizer needed for use with TN liquid crystal material. Typically, a thin entrance polarizer is utilized in conjunction with TN liquid crystal material. Conventional TNLC configurations only change the state of light polarization. Polarizers are required to transform the light polarization changes to light intensity differences which are detectable by the human eye. Film polarizers, commonly utilized because of their low cost, have thicknesses on the order of 150 to 400 microns. If the colored light from the phosphor emitters is polarized by the entrance polarizer after being channeled through the fiber optic face plate, the spatial differentiation of the emitted light created by the fiber optic face plate will not be maintained as it passes through the polarizer. Instead, the light will spread in proportion to the thickness of the polarizer, the magnitude of such spreading depending on the divergence of the rays at exit from the optical fibers. This defeats the light channeling effect of the fiber optic face plate. Thus, a conventional polarizer could not be used effectively in conjunction with the fiber optic face plate, and a more expensive, potentially more fragile polarizer would have to be fabricated as an extremely thin film to reduce the spreading of the polarized light to adjacent pixels. In high resolution displays, the thickness of the polarizer would have to be less than the pixel size, which is in the range of approximately 50 to 150 microns, to prevent the colored light from illuminating adjacent pixels.

SUMMARY OF THE INVENTION

The present invention utilizes an effective light coupling lens array means for coupling primary colored light from an individual emitter of a high efficiency color emitting backlight source to a respective individual pixel element of a transmissive liquid crystal light valve, at the same time permitting the use of a conventional entrance polarizer, required for appropriate optical control in a TNLC display configuration, while still preserving the spatial differentiation of the emitted light created by the coupling means. The light coupling lens array means, disposed between the front, colored light emitting surface of the light source and the entrance polarizer to the liquid crystal light valve, collects the light emitted from each colored light emitter and focuses it as a real image on a respectively coupled pixel element of the active matrix, while allowing the collected light to pass through the entrance polarizer and glass substrate of the light valve. The light coupling lens array means may be fabricated as a distinct planar layer to optimize fabrication techniques and need not be bonded to or fabricated on a substrate of the light source or the liquid crystal cell. Examples of suitable and effective light coupling lens array means are a three layer, two dimensional array of strip lenses, a two dimensional array of microlenses, and an array of gradient index rod lenses, such as a SELFOC lens array. SELFOC is a trademark owned by Nippon Sheet Glass Co. The focusing of light from each individual colored light emitter directly into the transparent portion of the corresponding pixel element prevents stray colored light from entering adjacent pixels and thus maintains the chromatic integrity of each individual pixel in the full color image produced. In addition, the light focused directly into the transparent portion of the pixel avoids the shadowing caused by the opaque active matrix element and addressing interconnect, and allows more light to pass through the liquid crystal cell. The elimination of the mosaic of color filters typically used to produce a full color display also allows more of the light to pass through the display cell, resulting in a bright display with a high contrast ratio.

In accordance with the present invention, therefore, there is provided a full color display which comprises light source means having a plurality of individual primary color visible light emitters for providing primary color visible light with wavelength emission spectra in at least three primary colors. The plurality of individual primary color visible light emitters are arranged spatially on the light source means so that light from each of three different primaries forms a mixture color to the human eye through the technique of additive spatial juxtaposition.

Image forming means are positioned to receive light from the light source means and to form the full color image. The image forming means includes a matrix of individually addressable light modulating pixel elements, the matrix having associated modulation means for modulating the amount of primary color visible light received from the light source means according to the full color image to be formed. Light coupling lens array means are disposed between the light source means and the image forming means, for collecting the primary color visible light from each light emitter and for focusing the collected primary colored visible light as a real image into a respectively coupled transparent pixel element in the planar matrix. The image of the collected primary color visible light is smaller in size than the transparent pixel element. Several different embodiments of the light coupling lens array means are described to illustrate the optical characteristics required. For example, the light coupling lens array means may be a two-dimensional planar array of two-phase, gradient index rod lenses which focus the collected primary color light from a light emitter as a real, noninverted image into a respectively coupled pixel. Image display means display the visible full color image formed on the image forming means in such a manner as to be visible to a human observer.

In another embodiment of the full color display, the image forming means is preferably a transmissive liquid crystal cell having a pair of transparent substrates for containing a light modulating liquid crystal material. The matrix of individually addressable light modulating pixels with associated modulation means is disposed on one of the transparent substrates of the liquid crystal cell; and a voltage source connected to the transparent substrates provides an electric field across the liquid crystal material. The modulation means modulates optical transmission of the primary color visible light through each individually addressable light modulating pixel according to the image to be formed by the liquid crystal cell in response to signals received from the voltage source.

In still another embodiment, the full color display is a full color transmissive liquid crystal display comprising light source means having a light emitting surface and having a plurality of phosphor emitters for providing to the full color display visible light with wavelength emission spectra in at least three primary colors. The plurality of phosphor emitters are arranged spatially on the light emitting surface so that light from each of at least three different primary color phosphor emitters forms a mixture color to the human eye by additive spatial juxtaposition. The light source means also includes excitation means for exciting the phosphor emitters to emit visible light. A transmissive liquid crystal cell, disposed to receive the primary color visible light from the light emitting surface, and having a pair of transparent substrates for containing a light conducting liquid crystal material, includes a planar matrix of individually addressable light modulating pixels with associated modulation means disposed on one of the transparent substrates. A voltage source connected to the pair of transparent substrates provides an electric field across the liquid crystal material, and the modulation means modulates optical transmission of primary color visible light through each individually addressable light modulating pixel according to the image to be formed by the liquid crystal cell, in response to signals received from the voltage source. Light coupling lens array means, disposed between the light emitting surface and the transmissive liquid crystal, optically couples the primary color visible light from each phosphor emitter to a respective one of the light modulating pixels. The light coupling lens array means has optical properties to collect substantially all of the primary color visible light from each emitter and focuses a real image thereof in the respectively coupled pixel. Image display means, disposed to receive the full color image from the transmissive liquid crystal cell, displays the full color image, and includes light diffusing means for displaying the image so that a human observer may view the image from on-axis and off-axis viewing angles.

In another aspect of the full color transmissive liquid crystal display, the matrix of individually addressable light modulating pixels and the light coupling lens array means are substantially the same size as, and in substantially aligned registration with, the light emitting surface of the light source means so that each pixel of the matrix is in substantially aligned registration with a respective one of the plurality of primary color visible light emitters. In this embodiment, the light coupling lens array means has optical properties to collect substantially all of the primary color visible light from each emitter and to focus a real image thereof in the respectively aligned pixel.

The novel features that are considered characteristic of the invention are set forth with particularity in the appended claims. The invention itself, however, both as to its organization and method of operation, together with other advantages thereof, will best be understood from the following description of the illustrated embodiments when read in connection with the accompanying drawings wherein like numbers have been employed in different Figures to denote the same parts.

DETAILED DESCRIPTION OF THE INVENTION

While the present invention will be hereinafter described in connection with a preferred embodiment, it will be understood that it is not intended to limit the invention to that embodiment. On the contrary, it should be understood that numerous changes in details of construction and in the combination and arrangement of elements and materials may be resorted to without departing from the true scope of the invention as defined by the appended claims. In particular, the full color display is described herein as a liquid crystal display operating in a transmissive, twisted nematic configuration having entrance and exit polarizers for controlling light transmission therethrough. Those skilled in the art will appreciate, however, that the novel combination of the patterned primary color light source and an image forming means, with a light coupling lens array means interposed between them for channeling light from the individual light emitters to individual pixel elements in the image forming means may be implemented in a light valve image forming technology which does not utilize liquid crystal, such as, for example, PLZT technology, and with a variety of liquid crystal materials, such as guest-host type material or phase-change guest-host material, which would not necessarily require entrance and exit polarizers for controlling light transmission.

1. Full Color Display Structure and Operation

Figure 3:
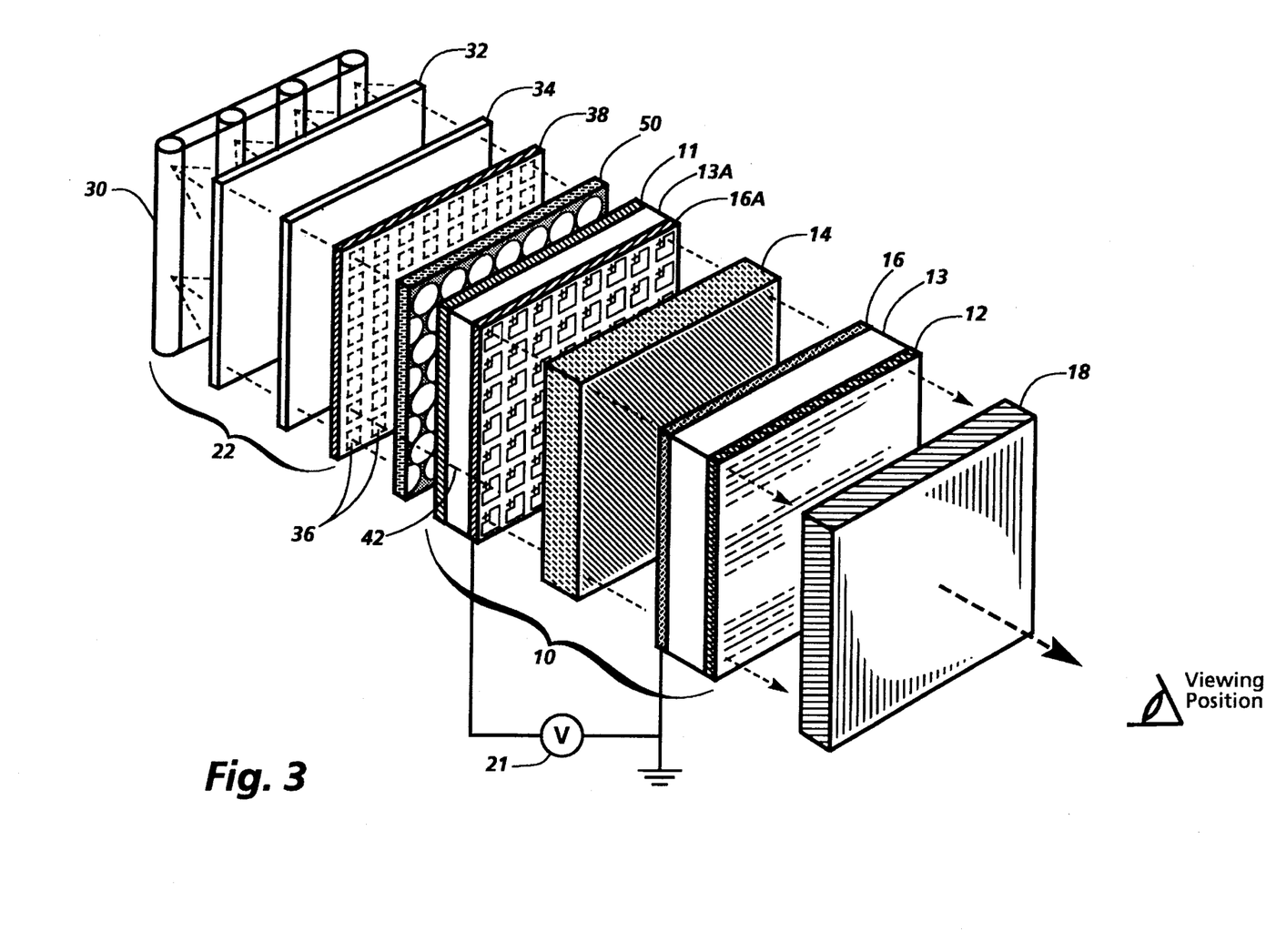
FIG. 3 is an exploded perspective view of the arrangement of the components used in the full color display of the present invention.

Turning now to the drawings, FIG. 3 is an exploded perspective view of a full color display in accordance with the present invention. Some of the details of construction of the full color display have been omitted from the representation of FIG. 3 for purposes of clarity. However, it will be appreciated by those skilled in the art that such omitted details relate to matters that are well known in the art.

The description of the structure of the display of FIG. 3 will proceed from the components on the left side of FIG. 3 to the components on the right side of FIG. 3, or from the radiation source to the surface of the display where a full color display image is perceptible to the human observer. References in the description and in the claims, to "in front of" and "behind" locations of components, and to the "front" and "rear" surfaces of components of the display of the present invention are defined with respect to the orientation of the human observer. Thus, for example, light coupling lens array 50 is located in front of light source 22 and behind liquid crystal light valve 10. Similarly, entrance polarizer 11 may be bonded on the rear surface of transparent substrate 13A, while active electrode matrix 16A is fabricated on the front surface of transparent substrate 13A.

As shown in FIG. 3, an embodiment of the present invention includes high efficiency light source 22 and liquid crystal light valve, with a light coupling lens array 50 interposed between them. As will be explained in more detail below, this combination permits the bonding of the entrance polarizer 11 on transparent substrate plate 13A, which is required for the optical control of light transmission when using nematic liquid crystal material in a twisted nematic configuration 14. In addition, each of the components 22, 50, and 10, of the present invention may be fabricated as discrete elements in order to take advantage of specialized fabrication techniques unique to each component. Each of the components 22, 50, and 10 may be separately mounted, as the application requires. For example, it may be practical to mount the high efficiency light source 22 separately from the remaining components so that it may be easily replaced. Alternatively, each of the components 22, 50, and 10 possibly may be laminated together using conventional techniques.

As already described earlier, in the discussion accompanying FIG. 2, high efficiency light source 22 is comprised of a patterned matrix of individual colored visible light emitters which emit colored visible light with wavelength emission spectra in at least three primary colors, and which are arranged spatially on the light-emitting surface of light source 22 so that light from each of three different primary color visible light emitters forms a mixture color to the human eye by additive spatial juxtaposition. The spatial arrangement of the primary color light emitters in this manner and control of the transmission of each primary color light through the image forming means enables the display to produce mixture colors across the full spectrum of visible color. Any suitable energy source may be used which provides the energy necessary for exciting the primary color emitters to emit visible primary colored light.

High efficiency light source 22 described herein is preferably a matrix of a combination of different phosphor elements 36 fabricated on reflecting dichroic layer 38. Each phosphor element of matrix 36 is excited with ultraviolet radiation, as described in U.S. Pat. No. 4,799,050, or by energetic electrons, to emit a different spectrum of visible radiation, thus forming a matrix of colored light emitters. Preferably, as shown in FIG. 3 by dotted line 42, each phosphor colored light emitter of matrix 36 is in substantially aligned registration with the corresponding element of the active matrix electrode configuration 16A. However, as explained below in the discussion accompanying FIGS. 9A and 9B, matrix 36 need not be the same size as, nor in substantial alignment with, active matrix electrode configuration 16A. The optical properties of light coupling lens array 50 may be designed so as to couple light from each phosphor colored light emitter of matrix 36 to a corresponding, respective element of the active matrix electrode configuration 16A without their being in substantial alignment.

Active electrode matrix 16A, comprising metalized buses and transparent electrodes, is fabricated on one of the transparent substrates, 13 or 13A. The fabrication of the active matrix for spatially distributing voltages from voltage source 21 on individual transparent electrodes for the purpose of affecting the optical state of a liquid crystal material is well known in the art and has been briefly described above. Rear transparent plate 13A encloses a thin film of liquid crystal material 14 between the active matrix 16A and front transparent plate 13. Front transparent plate 13 has a transparent conducting coating 16, usually indium tin oxide ("ITO"), on the surface facing the liquid crystal material 14 which serves as an electrode for placing a voltage across the liquid crystal material 14 from a voltage source 21. The operation of a twisted nematic liquid crystal light valve has been described above in the discussion accompanying FIGS. 1A and 1B. The exit polarizer, or analyzer, 12 is placed in front of front transparent plate 13. Entrance polarizer 11 and analyzer 12 are shown mounted as thin film layers, each directly on an adjacent component.

A light diffuser in the form of optical screen 18 may be used to diffuse the light exiting the display in a manner to meet the requirements of the application so that the image formed by transmissive liquid crystal component 10 would be visible to a human observer at substantially all viewing angles, including viewing angles which are perpendicular to the display surface (i.e., "on-axis" viewing angles), and viewing angles which are not perpendicular to the display surface (i.e., "off-axis" viewing angles). Such a screen could be a light scattering device such as ground glass which would isotropically diffuse the image. The screen could also be a lenticular lens which would direct the light in a preferred direction or directions. The use of ground glass or lenticular lenses as screen materials is well known in the art. Alternatively, the full color imaged formed by transmissive liquid crystal component 10 may be projected to a viewing surface using conventional projection optical elements.

Light coupling lens array 50 collects the light rays emitted from each phosphor emitter in phosphor matrix 36 and focuses them on a corresponding transparent electrode in the active matrix 16A. The optical characteristics of light coupling lens array 50 are such that substantially all of the collected light rays from each phosphor emitter are focused in a beam smaller than the size of the pixel element. Light coupling lens array 50 should focus light rays 40 (FIG. 2) from each emitter into the respective pixel element as a real, noninverted image, preferably smaller than the size of the pixel element. Collection of the light from each emitter in this manner will permit the focused light to pass through entrance polarizer 11 with minimal scattering or divergence, and then through glass substrate 13A and the respectively aligned pixel element in active matrix 16A, unobscured by the opaque pixel interconnect elements. The light coupling lens array thus efficiently provides a high percentage of the light emitted from light source 22 to and through transmissive liquid crystal component 10.

2. Light Coupling Lens Array Embodiments a. Rod Lens Array with Graded Index of Refraction Turning now to FIG. 4, one optical element which is suited for use as light coupling lens array 50 is an array 52 of gradient index rod lenses, hereafter referenced by the trade name of a "SELFOC" lens array. SELFOC lens array 52 is built from an array of individual optical fibers 56 and 57 which have a graded index of refraction which is larger in the middle than on the edge, each fiber having cylindrical symmetry about the fiber axis, and, in general, flat, planar entrance and exit faces. The graded index of refraction has the effect of refracting light in a way similar to a convex lens. The SELFOC lens array of the present invention may be constructed according to known conventional fabrication techniques.

Figure 4:
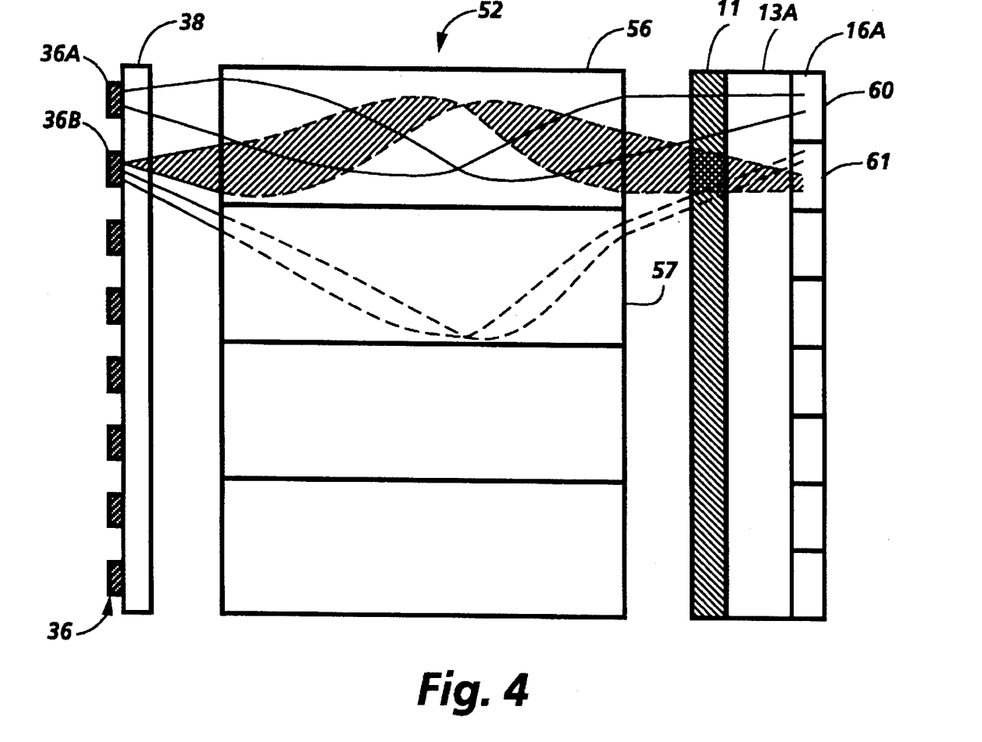
FIG. 4 is a schematic side view of a portion of the full color display which illustrates a gradient index lens array as the light coupling lens array in accordance with an embodiment of the invention and which serves to illustrate light propagation through the device.

From the perspective of propagating light through the full color display as shown in FIG. 3, SELFOC lens array 52 is positioned between phosphor emitter layer 36 (which is fabricated on reflecting dichroic layer 38) and active matrix layer 16A mounted on glass substrate 13A. As noted above, thin film entrance polarizer 11 may be mounted on the surface of glass substrate 13A as shown. Alternatively, thin film entrance polarizer 11 may be positioned between phosphor emitter layer 36 and SELFOC lens array 52. An individual lens 56 of SELFOC lens array 52 is larger than and images more than one phosphor light emitter. As shown in FIG. 4, the light from both phosphor emitters 36A and 36B enters lens 56 to be focused into pixels 60 and 61, respectively, of active matrix 16A. In addition, substantially all of the light leaving any single emitter point may be collected by more than one individual SELFOC lens into the same image point in the respective pixel. For example, as shown in FIG. 4, light leaving emitter 36B passes through both individual lenses 56 and 57 and is imaged on respective pixel 61.

To prevent the light from each emitter from being inverted by the SELFOC lens array when it is imaged on the respective TNLC pixel element, lens array 52 is preferably composed of individual two phase SELFOC lenses, each of which collects the light from a point and causes it to be refocused twice so that the image on the second focal plane where it is imaged on the liquid crystal light valve is not inverted. Those skilled in the art will recognize that maintaining a noninverted image enables the imaging of more than one phosphor element by one lens in lens array 52, and more easily preserves the correspondence of a phosphor emitter with a single pixel. However, it is to be understood that a single phase SELFOC lens array may also be used in the implementation of the present invention, with appropriate adjustments being made as necessary for the spatial configuration of the phosphor elements and the corresponding pixel elements on transparent electrode layer 16A, and for controlling light modulation and image formation in the light valve.

Figure 5:
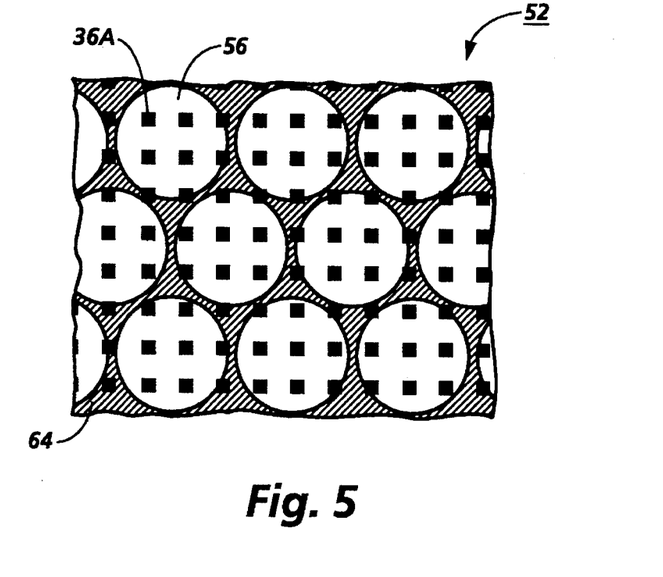
FIG. 5 is a partial front view of the gradient index lens array of FIG. 4, positioned over the light source according to the present invention.

Turning now to FIG. 5, there is shown a front view of the arrangement of a portion of the SELFOC lens array used as the light coupling lens array 50 (FIG. 3) of the present invention. The array 52 of gradient index fibers is two dimensional, arranged in an offset structure. The matrix pattern of color phosphors shown in FIG. 5 is one suitable arrangement for the primary color phosphor emitters, but it is understood that the primary color phosphor emitters may be arranged in other patterns suitable for the human eye to form a mixture color from at least three different spatially arranged primary color light emitters. Each SELFOC lens 56 images many emitter points 36A, with some emitter points being imaged by more than one SELFOC lens. The interstitial area 64 between the individual SELFOC lenses must be light absorbing in order to prevent light from passing between the individual SELFOC lenses, since such light would not be properly collected and focused and would potentially stray into adjacent pixel elements. This may be accomplished by fabricating the SELFOC lens array 52 with absorbing interstitial material or by applying an absorbing mask to the surface of lens array 52 closest to phosphor layer 36. Those skilled in the art will recognize that the two-dimensional array of SELFOC lenses utilized in the full color display of the present invention functions analogously to the linear SELFOC lens array well known in the art for use in electrophotographic copying devices.

b. Plural Strip Lens Arrays

Figure 6:
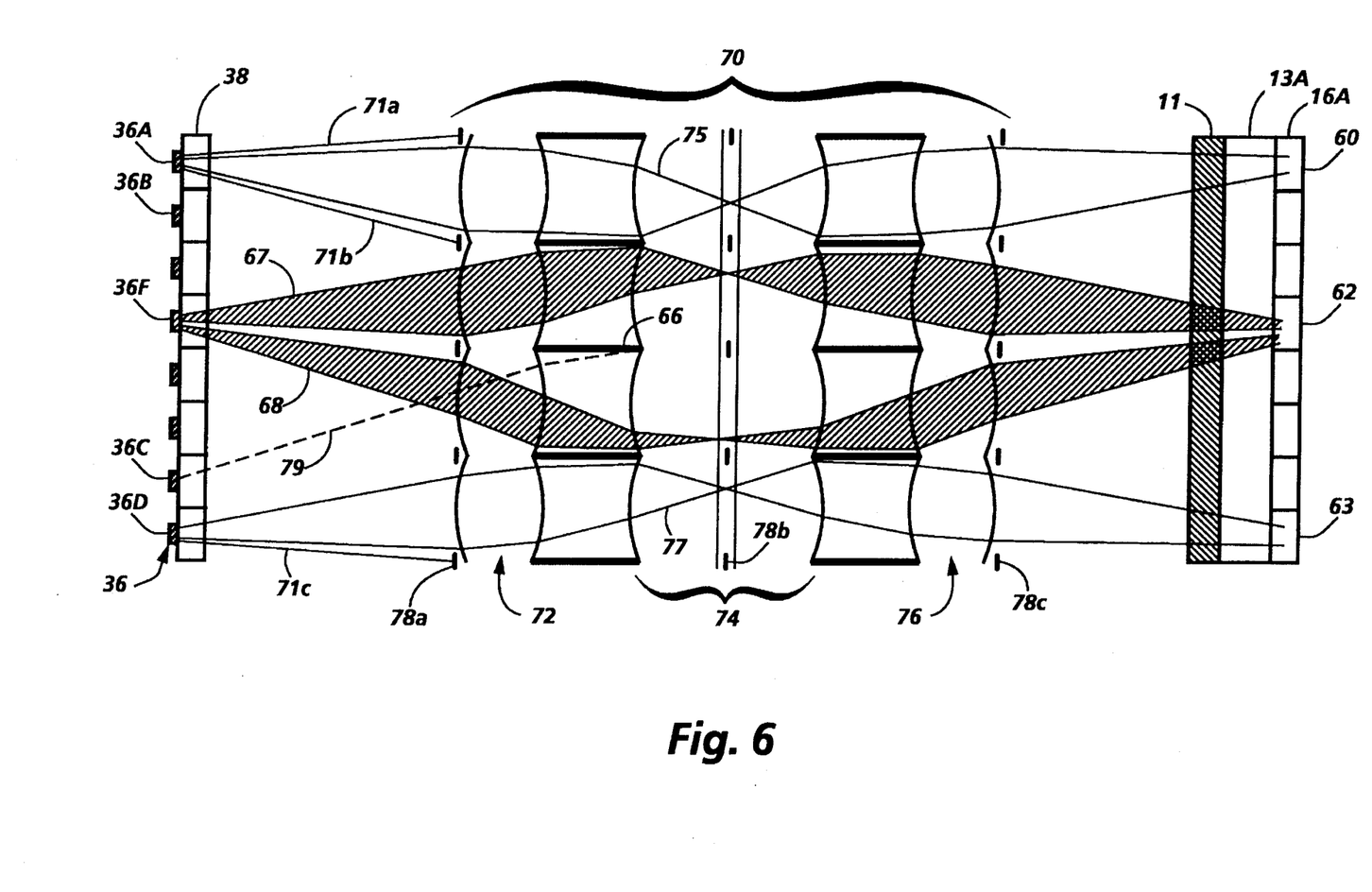
FIG. 6 is a schematic side view of a portion of the full color display which illustrates a plural layer, two dimensional microlens array as the light coupling lens array according to an embodiment of the invention and which serves to illustrate light propagation through the device.

FIG. 6 illustrates another embodiment of the light coupling lens array 50 of FIG. 3. An alternative for light coupling lens array 50 is a multiple layer, two-dimensional planar array of lenslets, or microlenses, generally designated by the reference numeral 70 and hereafter referred to as a "microlens array". Microlens array 70 is located between phosphor emitter matrix 36 and active matrix 16A, shown mounted on transparent substrate 13A. As noted above, thin film entrance polarizer 11 may be mounted on the surface of glass substrate 13A as shown, or it may be located anywhere between phosphor emitter matrix 36 and active matrix 16A.

Microlens array 70 is, in essence, the two dimensional analog of what is known in the art as a "strip tens". The multiple layer, planar array of lens elements (strip lenses) may be made of any substance suitable for the purpose of the display, including molded plastic, glass, or quartz. Manufacture of such a lens array is known in the art, and may include, but is not limited to, the utilization of a plastic molding polymerization method, or an ion exchange diffusion method. Each of the three layers of lens array 70, respectively referred to hereafter as first imaging element 72, field imaging element 74, and second imaging element 76, is in substantial alignment with an adjacent layer. Light absorbing shields, or aperture plates, 78a, 78b, and 78c, fabricated of suitable light absorbing material, are placed at the juncture of the individual strip lenses in each layer of lens array 70 as shown in FIG. 6, in order to absorb stray light from the phosphor emitters of phosphor layer 36, such as rays 71a and 71b from phosphor emitter 36A, and ray 71c from phosphor emitter 36D. Similarly, horizontally positioned baffles, as illustrated by baffle 66, also fabricated of suitable light absorbing material, are located at lens junctures between the adjacent layers of lens array 70 to absorb light from phosphor emitters that would not be imaged correctly into the appropriate pixel, such as light ray 79 from phosphor emitter 36C.

The combination of first imaging element 72 and second imaging element 76 produces a real, noninverted image of the phosphor in the respective display pixel. The effective distance between phosphor matrix 36 and first imaging element 72 is preferably greater than the distance between first imaging element 72 and field imaging element 74. Thus, the image of the light emitted from a phosphor emitter is demagnified in the plane of field imaging element 74. Similarly, the effective distance between second imaging element 76 and display pixel matrix 16A is preferably greater than the distance between field imaging element 74 and second imaging element 76. Thus, the demagnified image in the plane of field imaging element 74 is reimaged and magnified in the respective display pixel in matrix 16A by second imaging element 76. The demagnification and subsequent magnification of the imaged light substantially eliminates uneven imaging of the light from the phosphor emitters in the respective display pixels of active matrix 16A. Some of the light from certain emitters may strike microlens array 70 at a juncture of individual lenses; this light is absorbed by aperture plate 78a and is not imaged in the respective display pixel. With placement of the imaging elements so as to provide for demagnification of the inverted image, and subsequent magnification of the noninverted image, substantially all light that is collected from each emitter is uniformly imaged in the respective display pixel of active matrix 16A. In addition, field imaging element 74 also prevents vignetting. That is, the light rays forming the image points near the edge of a lenslet would miss the second imaging element 76, causing poor illumination for these points near the edge of each lenslet. Field imaging element 74 redirects these rays back into the lenslets in second imaging element 76, thus achieving uniform illumination on active matrix 16A. The preferred combination and placement of these three imaging elements of microlens array 70 thus provides relatively uniform imaging of the entire plane of the light emitting phosphor layer 36 and, consequently, relatively uniform illumination on the pixel elements of active matrix 16A.

As shown by the trace 75 of light rays leaving phosphor emitter 36A, a microlens of first imaging element 72 creates a real, inverted and preferably demagnified image of the visible primary color light rays emitted from phosphor element 36A in the plane of field imaging element 74. A microlens of second imaging element 76 reimages and preferably magnifies this real image into the respective pixel element 60 of active matrix 16A. Similarly, as shown by the trace 77, light rays leaving phosphor emitter 36D are directed into respective display pixel 63 of active matrix 16A. Traces 67 and 68 of light rays leaving phosphor emitter 36B illustrate that two strip lenses may image light from the same phosphor emitter and direct it into respective display pixel 62.

Figure 7:
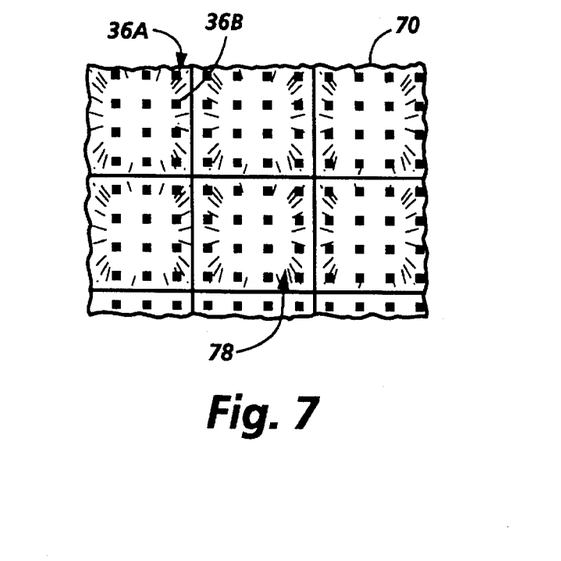
FIG. 7 is a partial front view of the three layer, two dimensional microlens array of FIG. 6, positioned over the light source according to the present invention.

Turning now to FIG. 7, there is shown a front view of the arrangement of a portion of microlens array 70 used as the light coupling lens array 50 (FIG. 3) of the present invention. Microlens array 70 is shown as a two dimensional array of square elements with approximately hemispherical contours. Those skilled in the art will appreciate that other lens arrangement configurations are possible. Each individual lenslet 78 of microlens array 70 images many emitter points 36A and 36B. Some emitter points may be imaged by more than one microlens; as can be seen in FIG. 6, primary color emitter point 36F is imaged by two lenslets in each microlens imaging element 72, 74, and 76, with each lenslet focusing the respective real image into the proper pixel element. If the individual microlenses are not square or have gaps between them, then the interstitial area between the individual lenslets should be filled with an absorbing medium or mask or shield to prevent colored light not collected and focused by the lenslets from straying through the pixel elements.

c. Microlens Array.

Figure 8:
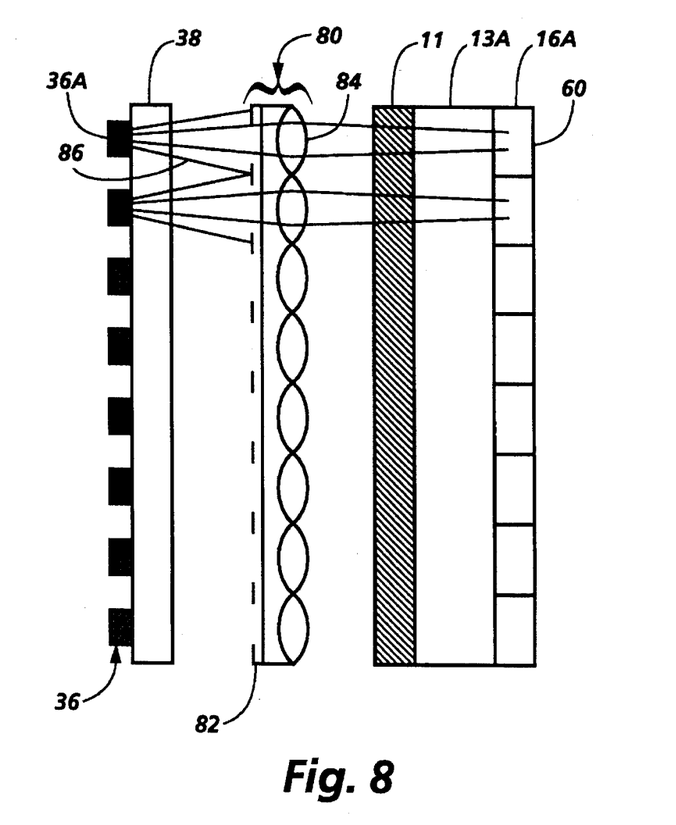
FIG. 8 is a schematic side view of a portion of the full color display which illustrates a two dimensional planar array of microlenses as the light coupling lens array according to an embodiment of the invention and which serves to illustrate light propagation through the device.

FIG. 8 illustrates another embodiment of the light coupling lens array 50 of FIG. 3. The embodiment illustrated in FIG. 8 is also a microlens array 80, each individual lenslet 84 being approximately the same size as a pixel element 60 in active matrix layer 16A so that one microlens 84 images only the light from one phosphor emitter 36A and focuses it into the corresponding respective pixel element 60 of active matrix layer 16A. Light from an individual light emitter which might otherwise enter an adjacent lenslet, for example light ray 86 emanating from phosphor emitter 36A, is optically masked by an opaque, light-absorbing shield 82 from reaching a pixel element of active matrix layer 16A other than the corresponding, respective pixel 60. Microlens array 80 may be fabricated according to known techniques. The focusing power of each lenslet in microlens array 80 is chosen to form a real inverted image which is smaller than the size of the pixel element 60 in active matrix layer 16A. Those skilled in the art will recognize that, because microlens array 80 is located in very close proximity to phosphor layer 36, the individual microlenses of microlens array 80 require a steep cone angle, and thus a relatively short focal length, a requirement which will affect the choice and thickness of the substrate upon which the microlenses are fabricated.

d. Additional Lens Array Design Considerations

Because of the fact that the index of refraction varies as a function of the wavelength of light, certain optical properties of light coupling lens array means 50 may also vary with wavelength. Longitudinal chromatic aberration, for example, is the variation of focus (or image position) with wavelength. In general, the index of refraction for optical materials is higher for short wavelengths than for long wavelengths; this causes the short wavelengths to be more strongly refracted at each surface of a lens. Lateral color or chromatic difference of magnification occurs when a lens system forms images of different sizes for different wavelengths, or spreads the image of an off axis point into a rainbow, resulting in a difference between the image points for different colors.

In some applications of the full color display described herein, there may be a requirement in the design of the plural strip lens arrays 70 embodiment of light coupling lens array means 50 to correct for chromatic aberrations. As those skilled in the art are aware, these corrections may be made through the use of achromatic doublet lenses in lens arrays 70, a technique sometimes called "achromatizing" the lenses. Generally stated, the achromatic doublet consists of a low relative dispersion element of the same sign power as the doublet and a high relative dispersion element of opposite sign, and the element powers are assigned according to known, conventional optical techniques. Achromatizing the lenses corrects for the different focal lengths of images of colored light of different wavelengths and ensures that substantially all of the light from each primary color phosphor emitter reaches the respectively coupled pixel.

Those skilled in the art will also recognize that when microlens array 80 is used as light coupling lens array means 50, chromatic aberrations may be corrected by selecting the proper surface curvature and index of refraction of each individual microlens, according to the specific wavelength of the primary color light the microlens will be imaging, in order to achieve the same focal length for each microlens, thus providing the same optical power for each lens, independent of color. This is possible because a single microlens will be paired with a single phosphor emitter and the wavelength of the primary color light that will be emitted and imaged by the microlens will be known.

Figure 9A:
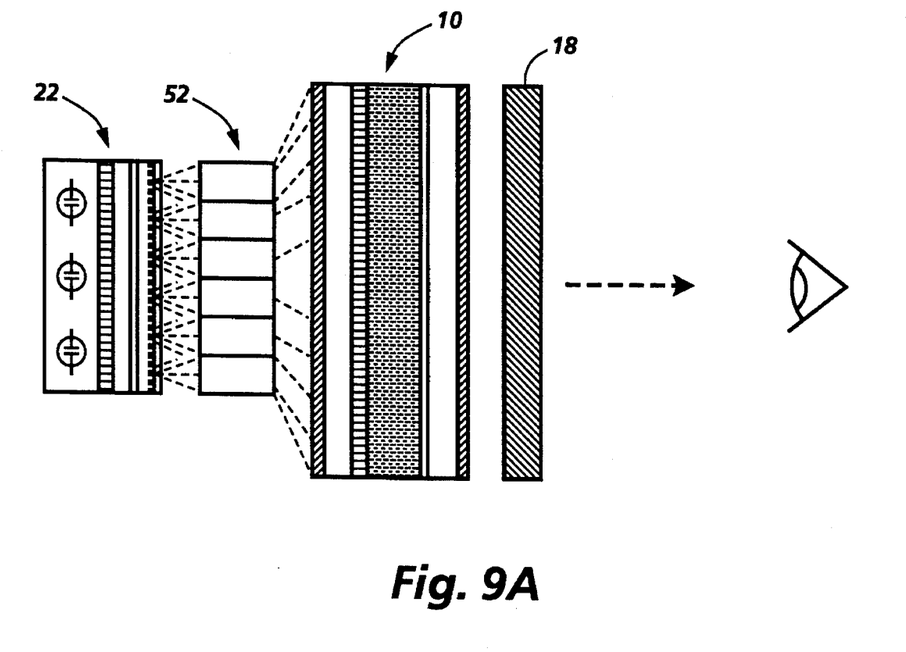
FIGS. 9A and 9B are schematic side views of enlarging and reducing embodiments of the display of the present invention.
Figure 9B:
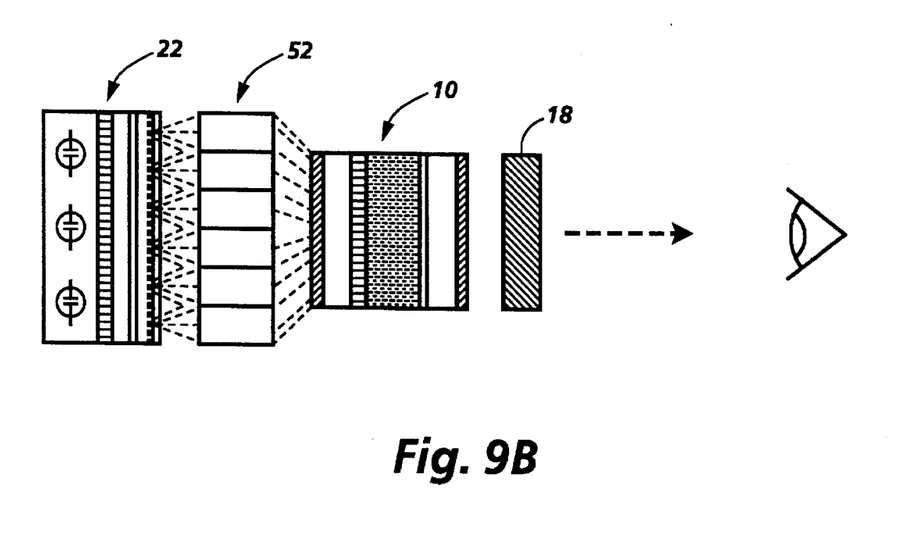

It is also contemplated, as shown in FIGS. 9A and 9B, that the full color display of the present invention may be designed and constructed to accommodate the design and fabrication requirements of light source 22. That is, if light efficiency improvements or reliability, or manufacturing cost savings may be accomplished by fabricating light source 22 to a particular size which is either larger or smaller than the desired size of the full color display, then the optical characteristics of light coupling lens array 50 may be modified by conventional optical techniques to either enlarge or reduce the imaging of the primary color light emitted from the light emitters of light source 22. FIG. 9A illustrates the use of an enlarging graded index rod (SELFOC) lens array 52 which images the primary color light emitted from patterned light source 22 and enlarges the imaged light focused into liquid crystal light valve 22 to produce a full color image which is larger than the light emitting surface of light source 22. Similarly, FIG. 9B illustrates the use of a reducing graded index rod (SELFOC)lens array 52 which images the primary color light emitted from patterned light source 22 and reduces the imaged light focused into liquid crystal light valve 22 to produce a full color image which is smaller than the light emitting surface of light source 22. Those skilled in the art will recognize that analogous optical modifications may be made to the plural strip lens arrays 70 shown in FIGS. 6 and 7, and to the microlens array 80 of FIG. 8 to either reduce or enlarge the imaged primary color light emitted from light source 22 and focused into liquid crystal light valve 10.

Another full color display design also accommodates the design and fabrication requirements of light source 22. In particular, for certain applications, such as high definition television and information intensive displays, a very large full color image is required. Designing and fabricating light source 22 to the full size of the display needed may increase the cost of the display, or may introduce display reliability problems. Projecting a large image from a single full color display of the present invention using conventional projection lens technology may not provide sufficient uniform brightness or uniform image sharpness and clarity for the requirements of the display application. However, as illustrated in FIG. 10, it is intended that such a large display may be designed by configuring a plurality of smaller displays 90 of the present invention.

Figure 10:
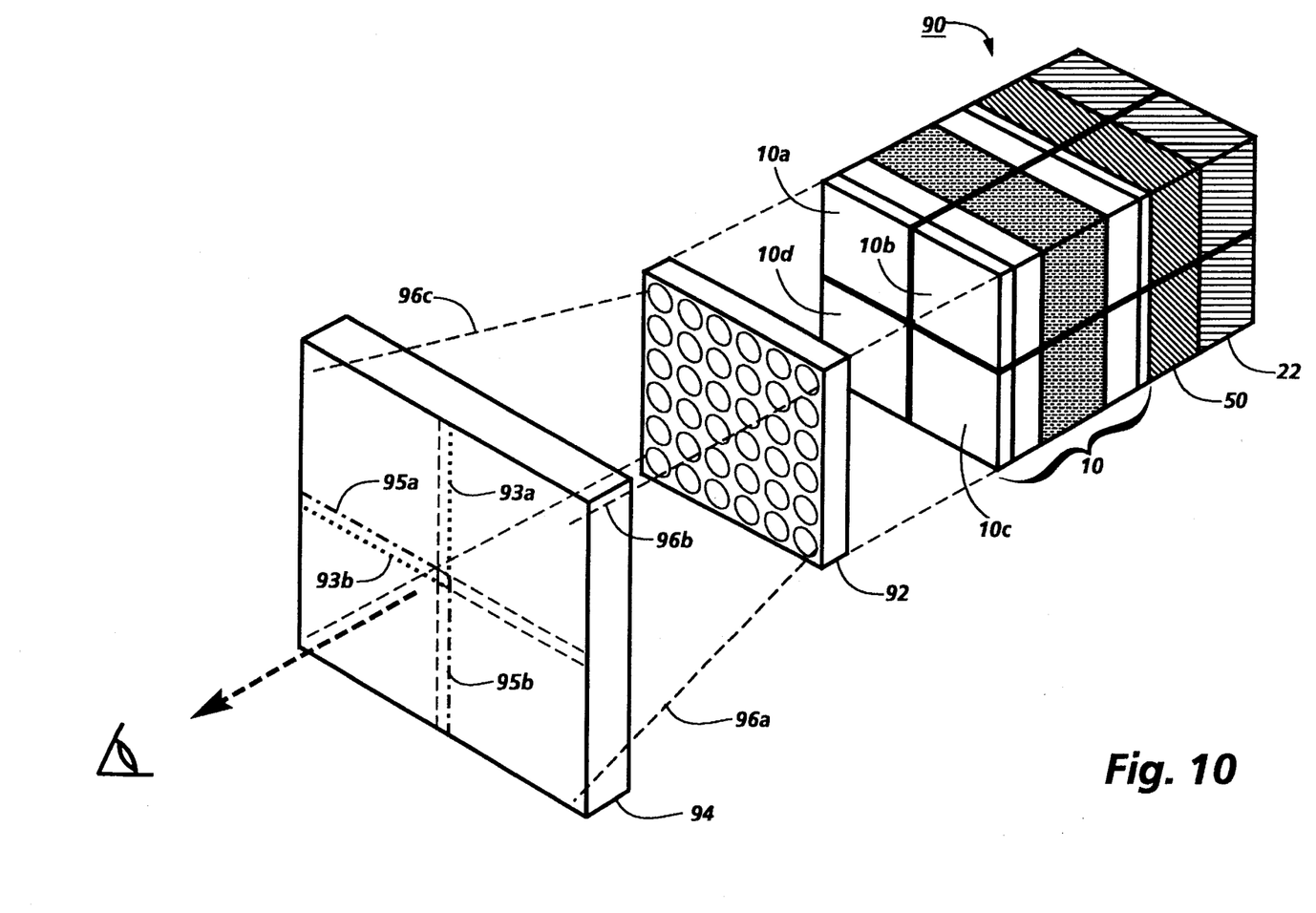
FIG. 10 is an exploded perspective view of the arrangement of the components for a full color display which produces a large image from a plurality of smaller full color displays of the present invention abutted together.

FIG. 10 illustrates four displays of the present invention abutted together in a single display unit 90, each smaller display being composed of light source 22, light coupling lens array means 50, and liquid crystal light valve 10, each of which operate as earlier described. The full color images emanating from the front surfaces 10a, 10b, 10c, and 10d of light valve 10 are portions of the full color image desired, and the modulation of light through each individual display is modified accordingly to control its respective portion of the final image. The full color images emanating from the front surfaces 10a, 10b, 10c, and 10d of light valve 10 enter conventional enlarging SELFOC lens array 92 which focuses and enlarges each quadrant of the final image on viewing surface 94, as shown by dotted lines 96a, 96b, and 96c, to overlap sufficiently to present a complete, full color image with substantially no artifacts or missing image portions that might otherwise have occurred from the dark regions where the four individual smaller displays are abutted together. For example, the full color image emanating from front surface 10a of the upper left light valve 10 of display 90 is focused and imaged by SELFOC lens array 92 to produce the upper left quadrant of the full color image on viewing surface 94 demarcated by dotted lines 93a and 93b. Similarly, the full color image emanating from front surface 10d of the lower left light valve 10 of display 90 is focused and imaged by SELFOC lens array 92 to produce the lower left quadrant of the full color image on viewing surface 94 demarcated by dotted lines 95a and 95b. In this manner, a bright, high resolution full color image may be produced without exceeding the practical design constraints imposed by the physical operational and fabrication requirements of light source 22.

It can be seen from FIGS. 9A, 9B, and 10 that the novel features of the present invention provide a bright full color display with a high level of chromatic integrity that may be designed and implemented for a wide range of display applications.

3. Conclusions

In recapitulation, the full color display of the present invention provides a number of readily apparent advantages. The full color display illustrated herein enables the efficient use of a substantial amount of the light emanating from a light source having a matrix of individual primary color sources, thus eliminating the need for the light absorbing color filter or filters typically used in full color liquid crystal and other light conducting displays, without sacrificing the ability to produce a wide gamut of colors and the ability to control color fidelity. The efficient light source may be used in combination with a liquid crystal light valve using a twisted nematic configuration which provides high contrast ratios. The light coupling lens array permits the collected and focused light from each emitter to pass through the entrance polarizer required in a twisted nematic configuration with minimal scattering or divergence. However, it will be apparent to those skilled in the art that the invention on is not limited to the twisted nematic liquid crystal configuration, and may be used effectively with any type of liquid crystal display configuration, and with other light conducting or reflecting image forming technologies. The use of active matrix technology to modulate the light propagating through the display achieves response times suitable for displays having high information content, and in conjunction with software which displays animation or uses a pointing device. The colored light source, the light coupling lens array, and the active matrix driving the liquid crystal display each may be fabricated independently on transparent substrates which are optimized for their respective manufacturing processes, thereby affording an opportunity to lower unit manufacturing costs.

The primary colored light collected from each emitter and focused through the transparent part of the respectively aligned liquid crystal cell by the light coupling lens array, such as the SELFOC lens array or the two microlens arrays illustrated, insures the chromatic integrity of the color produced in each individual pixel by substantially eliminating the stray light entering adjacent pixels, avoids shadowing by the opaque portions of the pixel elements, and provides a bright, high contrast, full color image on a display having a compact size.

It is therefore evident that there has been provided in accordance with the present invention, a full color display which fully satisfies the objects, aims, and advantages hereinbefore set forth. While this invention has been described in conjunction with specific embodiments thereof, it is evident that many alternatives, modifications and variations will be apparent to those skilled in the art, such as those illustrated in FIGS. 9A, 9B, and 10. Accordingly, it is intended to embrace all such alternatives, modifications and variations as fall within the scope of the appended claims.

What is claimed:

1. A full color display comprising:
   light source means having a light emitting surface and having a plurality of individual visible light emitters for providing to the full color display visible light with wavelength emission spectra in at least three primary colors, the plurality of primary color visible light emitters being arranged spatially on the light emitting surface so that light from at least three different primary color visible light emitters forms a mixture color by additive spatial juxtaposition, primary color visible light emitted from the light emitting surface being spatially separated at the light emitting surface;
   image forming means for receiving the primary color visible light from the light source means and for forming a full color image; the image forming means having a matrix of individually addressable light modulating pixels, the matrix having modulation means associated with it for modulating the amount of primary color visible light received from the light source means;

light coupling lens array means, disposed between the light emitting surface and the image forming means and not abutted against the modulation means, for optically coupling the primary color visible light from one of the plurality of primary color visible light emitters to a respective one of the light modulating pixels; each lens of the light coupling lens array means having optical properties to collect substantially all of the primary color visible light from more than one of the plurality of primary color visible light emitters and to focus a real image thereof in the respective one of the light modulating pixels, the light coupling lens array means including a plurality of two-dimensional planar arrays of lenslets, disposed adjacent to each other, each planar array of lenslets being in substantial alignment with adjacent planar arrays of lenslets; the plurality of two-dimensional planar arrays of lenslets having optical properties to collect primary color visible light from each of the primary color visible light emitters and to focus each collection of primary color visible light as a real image into the respective pixel of the image forming means; and image display means, disposed to receive the full color image from the image forming means, for displaying the full color image in such a manner as to be visible to a human observer.

2. The full color display according to claim 1 wherein the plurality of two-dimensional planar arrays of lenslets are further optically constructed as achromatic doublet lenses to correct for chromatic aberrations.

* * * * *